(12) United States Patent
Hsia

(10) Patent No.: US 12,550,237 B2
(45) Date of Patent: Feb. 10, 2026

(54) SOLID-STATE LIGHTING WITH IMPERCEPTIBLE VISUAL STIMULI

(71) Applicant: Aleddra Inc., Renton, WA (US)

(72) Inventor: Chungho Hsia, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 127 days.

(21) Appl. No.: 18/761,773

(22) Filed: Jul. 2, 2024

(65) Prior Publication Data

US 2025/0098046 A1    Mar. 20, 2025

Related U.S. Application Data

(63) Continuation-in-part of application No. 18/370,841, filed on Sep. 20, 2023, now Pat. No. 12,382,563.

(51) Int. Cl.
  *H05B 45/305*    (2020.01)
  *H05B 45/31*    (2020.01)
  *H05B 45/59*    (2022.01)

(52) U.S. Cl.
  CPC ........... *H05B 45/305* (2020.01); *H05B 45/31* (2020.01)

(58) Field of Classification Search
  None
  See application file for complete search history.

(56) References Cited

U.S. PATENT DOCUMENTS

| | | | | |
|---|---|---|---|---|
| 2012/0200229 A1* | 8/2012 | Kunst | ................ | H05B 45/385 315/186 |
| 2014/0001975 A1* | 1/2014 | Lee | ...................... | H05B 45/46 315/224 |
| 2016/0073469 A1* | 3/2016 | Fukuda | ............. | H05B 45/3725 315/294 |
| 2017/0027030 A1* | 1/2017 | Wang | .................... | H05B 45/20 |

* cited by examiner

*Primary Examiner* — Anh Q Tran
(74) *Attorney, Agent, or Firm* — Andy M. Han; Han IP PLLC

(57) ABSTRACT

A light-emitting diode (LED) luminaire comprising two sets of LEDs, a phase-amplitude circuit, and an LED driving circuit is used to replace a conventional luminaire with a possible severe temporal light artifact. The phase-amplitude circuit is configured to produce two sets of modulating signals with a predetermined phase retardation between the two. The LED driving circuit is configured to produce two sets of LED driving current in response to the two sets of modulating signals and to drive the two sets of LEDs, resulting in imperceptible visual stimuli at temporal modulation frequencies as a result of possible frequency pre-mix. On the other hand, the imperceptible visual stimuli in another embodiment may cause human brain to perceive modulated lighting stimuli and to demodulate thereof into a benign stimulus in the brain without an apparent flicker, thereby endogenously entraining a gamma oscillation, and drastically reducing eyestrain and visual discomfort.

19 Claims, 6 Drawing Sheets

SOLID-STATE LIGHTING WITH IMPERCEPTIBLE VISUAL STIMULI

CROSS-REFERENCE TO RELATED APPLICATIONS

The present disclosure is part of a continuation-in-part (CIP) application of U.S. patent application Ser. No. 18/370,841, filed 20 Sep. 2023. Contents of the above-identified application are incorporated herein by reference in its entirety.

BACKGROUND

Technical Field

The present disclosure relates to light-emitting diode (LED) luminaires and more particularly to an LED luminaire that includes a phase-amplitude circuit used to modulate an LED driving circuit with two lighting stimuli at different modulation frequencies. A human brain may perceive the frequencies are being modulated and denote a beat frequency, which may endogenously entrain gamma oscillations in the brain.

Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential health concerns such as temporal light artifacts become especially important and need to be well addressed.

According to CIE 17.443 e-ILV, the temporal light artifact (TLA) is an undesired change in visual perception induced by a light stimulus whose luminance or spectral distribution fluctuates with time. A flicker, one of TLA, is a perception of visual unsteadiness for a static observer in a static environment. Furthermore, according to IEEE 1789-2015, flickers are variations in luminance over time (i.e., temporal modulation of light). The health impacts of flicker in LED lighting to consumers have seldom been discussed. Occasionally, when some conventional luminaires or lamps fail resulting in flicker, concurrently introducing seizures in the small percentage of the population that suffers from photosensitive epilepsy. Magnetically ballasted fluorescent lamps or luminaires have flicker issues identified to be related to migraines, headaches, reduced visual performance and comfort, and other possible neurological health issues. When high frequency electronic ballasts become popular, the flicker issues of fluorescent lamps or luminaires diminish. However, a flicker component for such fluorescent lamps or luminaires is between 20% and 25%. For an incandescent lamp and a halogen lamp, the flicker frequency is 120 Hz, and the flicker component is between 15% up to 25%. Compact fluorescent lamps, as energy-saving lamps, have a flicker frequency in a range of 20 kHz to 150 kHz due to a built-in electronic power supply. The flicker component is between 20% and 40%. Since the brightness of LEDs responds instantaneously to an operating current, the flicker frequency and the flicker component depend on a driving current of a power supply used. The flicker component may be between 0% and 100%. The flicker frequency may be from 60 Hz to several hundred kHz, depending on a switching frequency of the power supply used to drive the LEDs. That is, for LED luminaires or lamps, the flicker is primarily determined by the power supply, and some possible health risks are associated with low-frequency modulation of the LEDs.

According to IEEE Recommended Practice (2015), regarding flicker, potential flicker-induced impairments include: 1) neurological problems, including epileptic seizure; 2) headaches, fatigue, blurred vision, eyestrain; 3) migraines; 4) reduced visual task performance; 5) increased autistic behaviors, especially in children; 6) apparent slowing or stopping of motion (stroboscopic effect); 7) distraction. In this case, an LED driving circuit in the power supply must be designed to modulate LED driving current at benign frequencies and to suppress any low-frequency flicker components associated with AC mains in the first place in order to help protect against the health risks.

Experimental results of exposure to 40 Hz stroboscopic light, for one hour a day, have previously been published to show that the 40 Hz stroboscopic light is a potential treatment option for Alzheimer's disease in animal models because exposure to such a stroboscopic light can entrain gamma oscillations in a subject's brain, thereby improving the brain's health. However, exposure for an hour a day to the 40 Hz stroboscopic light can be strenuous to a human's vision. Alternative types of 40 Hz inducing stimuli with imperceptible flickers may be required if a long-term treatment is needed. In addition to 40 Hz stimuli, an imperceptible gamma-band sensory stimulation at a frequency of 65 Hz has been introduced to enhance episodic memory retrieval according to a study in England and Germany. Furthermore, a US patent publication (publication #: US 2020-0269065) discloses a method of treating depression, short-term memory loss, of improving cognition, of improving sleep, etc. using a blinking blue light at a frequency ranging from about 20 Hz up to about 60 Hz. However, when such a blue light source is disposed in a common lamp or a luminaire, a side-effect concern arises because constant exposure to the blue light source over time could damage retinal cells and cause vision problems such as age-related macular degeneration. It can also contribute to cataracts, eye cancer, and growths on the clear covering over the white part of the eye. It is, therefore, a luminaire manufacturer's responsibility to design and to develop the luminaire friendly to consumers without eye discomfort associated with perceptible light flickers and potential risks of damaging to eyes. It is also essential that a luminaire in general lighting applications must meet a requirement of color rendering index (Ra), which is Ra $\geqslant$ 80 and $R_9$>0. $R_9$ is calculated, along with its corresponding test color sample (TCS9), as a common recommendation to know about a light source's color quality. The luminaire shall be capable of providing at least one of the nominal correlated color temperatures (CCTs): 2700 K, 3000 K, 3500 K, 4000 K, and 5000 K. The luminaire chromaticity shall also fall within the corresponding 7-step chromaticity quadrangles as defined in ANSI/NEMA/ANSLG C78.377-2011. It will be demonstrated that a novel technology based on controlling two white LEDs at different CCTs to produce a white light at a third CCT where the two white LEDs alternates at a given temporal modulation frequency without perceptible flicker still can entrain gamma oscillations in different cortical and subcortical structures of the human brain. In various studies, it has been shown that a steady state visual evoked potential (SSVEP), widely used within the field of Brain Computer Interface (BCI), appears even when the stimulation at a given flicker frequency is perceived as imperceptible by an observer. Instead of doing a temporal modulation between light being on and off (i.e., a 100% modulation depth), the imperceptible flicker can be made by using temporal modulation between the two white LEDs with different spectral power distributions.

The temporal modulation frequency at which flicker disappears is referred to as the flicker threshold or, more commonly, the critical flicker frequency (CFF), which is 48 Hz for brightness flicker. The brightness flicker occurs when the two modulation signals are in phase. The phenomenon of disappearance of flicker at that frequency is called flicker fusion. Although two complementary modulation signals were used in a U.S. patent application Ser. No. 18/370,841, filed 20 Sep. 2023, to suppress light flickers from the first type of LEDs and the second type of LEDs, a tiny flicker may be detected by customers who have acute visions. Especially, a frequency of 48 Hz is not high enough to ensure that most customers see it as imperceptible. To satisfy those customers with acute visions, the LED luminaire must increase modulation frequencies to a level greater than CFF with a difference frequency in a benign frequency band such as theta oscillations, which may trigger gamma oscillations, thereby endogenously and indirectly stimulating neurons in the human brain.

SUMMARY

An LED luminaire comprising one or more LED arrays, at least one power supply unit, a phase-amplitude circuit is used to replace a conventional luminaire with possible severe light flickering. The one or more LED arrays may comprise a first set of LED arrays and a second set of LED arrays, each with a forward voltage. Each of the first set of LED arrays and the second set of LED arrays comprises a positive terminal and a negative terminal. The at least one power supply unit is coupled to alternate-current (AC) mains and configured to convert a line voltage from the AC mains into a primary direct-current (DC) voltage greater than the forward voltage to operate the first set of LED arrays and the second set of LED arrays. The primary DC voltage is configured to apply on the positive terminal of both the first set of LED arrays and the second set of LED arrays with respect to a ground reference. The phase-amplitude circuit comprises a control device and an LED driving circuit. The control device is configured to produce a first set of modulating signal and a second set of modulating signal respectively at a first predetermined temporal modulation frequency and a second predetermined temporal modulation frequency. The LED driving circuit comprises at least two modulation circuits configured to produce a first set of driving current and a second set of driving current, in response to the first set of modulating signal and the second set of modulating signal, to respectively drive the first set of LED arrays and the second set of LED arrays. The at least two modulation circuits comprise at least two electronic switches each comprising a first terminal and a second terminal. The first terminal is configured to respectively connect to the negative terminal of the first set of LED arrays and the second set of LED arrays whereas the second terminal is configured to respectively connect to the ground reference. Each of the first set of modulating signal and the second set of modulating signal comprises square waves comprising a series of pulses with a duty cycle of at least 40% and a predetermined period. The first set of driving current and the second set of driving current both comprise the first set of modulating signal and the second set of modulating signal, both associated with the predetermined period whereas respective light emissions from the first set of LED arrays and the second set of LED arrays in response to the two sets of driving current comprise the predetermined period. When any one set of LED driving current is not present, the other set of LED driving current is configured to automatically raise a duty cycle to at least 75% to avoid noticeable blinking in overall light emissions from the first set of LED arrays and the second set of LED arrays, thereby reducing perceptible flicker.

In a first embodiment, the at least two modulation circuits comprise at least two electronic switches comprising at least two bipolar junction transistors (BJTs) each configured to be biased by a signal far greater than a typical base-emitter voltages ($V_{BE}$) of 0.7 volts, thereby acting as a nonlinear device. When the at least two BJTs operate, switching respectively at the first predetermined temporal modulation frequency and the second predetermined temporal modulation frequency cause an electrical and magnetic coupling between the first set of driving current and the second set of driving current, thereby generating a beat frequency between the first predetermined temporal modulation frequency and the second predetermined temporal modulation frequency. It may be called a frequency pre-mix. In the first embodiment, the first predetermined temporal modulation frequency and the second predetermined temporal modulation frequency are chosen such that a first greatest common divisor of the first predetermined temporal modulation frequency and the second predetermined temporal modulation frequency is a nominal 40 Hz. It is important to note that choosing the first greatest common divisor of the first predetermined temporal modulation frequency and the second predetermined temporal modulation frequency ensures that lighting stimulus of the beat frequency of 40 Hz cannot be seen because it sometimes synchronizes with the first predetermined temporal modulation frequency and the second predetermined temporal modulation frequency, thereby imperceptible. For example, the first predetermined temporal modulation frequency may be a nominal 80 Hz, whereas the second predetermined temporal modulation frequency may be a nominal 120 Hz. According to several studies regarding visual cortex and gamma rhythms in many human brain regions, the primary visual cortex (V1) is thought to play a role in information processing. Three narrowband gamma rhythms in V1 that process distinct spatial frequency (SF) signals have different neural origins. The low gamma (LG; 25 to 40 Hz) rhythm is generated at the V1 superficial layer and preferred a higher SF compared with a spike activity, whereas both the medium gamma (MG; 40 to 65 Hz), generated at the cortical level, and the high gamma HG; (65 to 85 Hz), are originated pre-cortically and preferred lower SF information. Most importantly, the three detected gamma rhythms are generated by different neural circuits. Some results show that the HG component is generated in the subcortical region and that the generation of LG and MG is caused by some cortical mechanisms. These reconcile contradicting mechanisms in related previous studies. Some results further show that the MG component was strongest in the V1 input layer although the LG is peaked in the V1 output layer. Neural circuits contain a wide variety of interneuron types, which differ in their biophysical properties and connectivity patterns. In hippocampus, some brain cells preferably lock to the peak of the 4-8 Hz theta oscillation, leading to resonances in the theta frequency band. Gamma frequencies (30-90 Hz) are associated with anything between coding and communication of information in neural circuits, to a wide range of cognitive functions. When the flicker information from the natural images enters the visual system through the retina, the flicker information might be dissected into the three different frequency channels in the superficial layer of V1 (primary visual cortex). A 80 Hz modulation of visual stimulus may generate a 80 Hz modulation in sub-cortex of a visual system. Due to a mechanism in the human brain, a 55 Hz modulation may be generated in the input layer of the primary visual cortex. The 80 Hz modulation and the 55 Hz modulation signals transmit to an output layer, and the mechanism may inhibit the 55 Hz to a lower frequency of 40 Hz. Note that the frequency of 40 Hz is in a range of an intrinsic frequency band of 25~50 Hz in subiculum of the human brain. Gamma rhythms are essential for memory encoding and retrieval. Gamma oscillations are the synchronization with a frequency of 30-90 Hz of neural oscillations, which are rhythmic electric processes of neuron groups in the brain. The interneuron network is necessary for the production of gamma oscillations, but certain disruptions such as brain inflammation, oxidative stress, and metabolic imbalances can cause this network to malfunction. Gamma oscillations specifically control the connectivity between different brain regions, which is crucial for perception, movement, memory, and emotion. Studies have linked abnormal gamma oscillations to conditions of the central nervous system, including Alzheimer's disease, Parkinson's disease, and schizophrenia. Evidence suggests that gamma entrainment using sensory stimuli provides significant neuroprotection. From both a physiological and pathological standpoint, the function of gamma oscillations in advanced brain activities should be gamma entrainment as a potential therapeutic approach for a range of neuropsychiatric diseases. Note also that 40 Hz, in a medium Gamma range, is a subharmonic of 80 Hz, in a long Gamma range. Stimuli at these temporal modulation frequency ranges do possibly benefit a subject's brain health because of internal resonances and communications among various cortical areas.

In a second embodiment, a configuration is similar to the first embodiment except that the phase-amplitude circuit further comprises a phase retardation circuit configured to retard an operation of the second set of modulating signal in a predetermined phase interval, relative to the first set of modulating signal. The LED driving circuit comprises at least two modulation circuits configured to produce a first set of driving current and a second set of driving current, in response to the first set of modulating signal and the second set of modulating signal, to respectively drive the first set of LED arrays and the second set of LED arrays. The at least two modulation circuits comprise at least two electronic switches configured to respond according to the first set of modulating signal and the second set of modulating signal. The at least two electronic switches, not necessarily BJTs as in the first embodiment, are configured to respond according to the first set of modulating signal and the second set of modulating signal. As mentioned in the first embodiment, the primary DC voltage is configured to apply on the positive terminal of both the first set of LED arrays and a second set of LED arrays with respect to the ground reference. Each of the at least two electronic switches comprises a first terminal and a second terminal. The first terminal is configured to respectively connect to the negative terminal of the first set of LED arrays and the second set of LED arrays, whereas the second terminal is configured to respectively connect to the ground reference. Each of the first set of modulating signal and the second set of modulating signal comprises square waves comprising a series of pulses with a duty cycle of at least 40% and a predetermined period. The two sets of driving current comprise two modulating signals both associated with the predetermined period whereas respective light emissions from the first set of LED arrays and the second set of LED arrays in response to the two sets of driving current comprise the predetermined period. When any one set of LED driving current is not present, the other set of LED driving current is configured to automatically raise a duty cycle to at least 75% to avoid noticeable blinking in overall light emissions from the first set of LED arrays and the second set of LED arrays, thereby reducing perceptible flicker. The primary DC voltage is configured to apply on the positive terminal of the first set of LED arrays and the second set of LED arrays with respect to the ground reference. To avoid the frequency pre-mixing as in the first embodiment, the LED driving circuit may further comprise filter assemblies configured to remove interference noises and unwanted frequency components.

In fact, when the light variation is sinusoidal, and the first LED driving current and the second LED driving current to the first set of LED arrays and the second set of LED arrays are modulated at a brain stimulation rate such as 70 Hz, and another brain stimulation rate such as 77 Hz, a beat frequency of 7 Hz will be generated in a theta frequency band. When the first set of LED arrays is powered on for a time interval (a several seconds) at 70 Hz, followed by being energized at 77 Hz, where the alteration is less than, say, 5 seconds, the brain will perceive the frequencies to be modulated.

In the second embodiment, the second predetermined temporal modulation frequency is higher than the first predetermined temporal modulation frequency. A second greatest common divisor, ranged from a nominal 4 Hz to 8 Hz, of the first predetermined temporal modulation frequency and the second predetermined temporal modulation frequency is chosen. For example, the first predetermined temporal modulation frequency may be a nominal 80 Hz, whereas the second predetermined temporal modulation frequency may be a nominal 88 Hz. It is important to note that flickering at the nominal 4 Hz to 8 Hz, well below CFF, is significantly apparent, and choosing the second greatest common divisor of the first predetermined temporal modulation frequency and the second predetermined temporal modulation frequency ensures that a beat frequency, if occurred due to the frequency pre-mix, cannot be seen because it sometimes synchronizes with both the first predetermined temporal modulation frequency and the second predetermined temporal modulation frequency, thereby imperceptible. However, the imperceptible visual stimuli cause human brain to perceive lighting stimuli that are modulated and to demodulate thereof into a benign stimulus in the brain without an apparent flicker, thereby indirectly and endogenously entraining a gamma oscillation and drastically reducing eyestrain, visual discomfort, etc. As for phase retardation in the phase retardation circuit, the second set of modulating signal is configured to retard at least 200 cycles relative to the first set of modulating signal. This ensures the subject's brain can react in response to these modulated stimuli in time.

Gamma oscillations specifically control the connectivity between different brain regions, which is crucial for perception, movement, memory, and emotion. As mentioned, studies have linked abnormal gamma oscillations to conditions of the central nervous system, including Alzheimer's disease, Parkinson's disease, and schizophrenia. On the other hand, once the frequency pre-mix occurs in the LED driving circuit, a perceptible visual stimulus at a frequency difference-a low frequency, may be seen. To avoid this phenomena, the second predetermined temporal modulation frequency must be higher than the first predetermined temporal modulation frequency, whereas a greatest common divisor of the first predetermined temporal modulation frequency and the second predetermined temporal modulation frequency may be chosen in a range from a nominal 4 Hz to 12 Hz to cover alpha and theta rhythms. More details are in the section of detailed description of various embodiments.

BRIEF DESCRIPTION OF THE DRAWINGS

Non-limiting and non-exhaustive embodiments of the present disclosure are described with reference to the following figures, wherein like names refer to like parts but their reference numerals differ throughout the various figures unless otherwise specified. Moreover, in the section of detailed description of the invention, any of a "primary", a "secondary", a "first", a "second", and so forth does not necessarily represent a part that is mentioned in an ordinal manner, but a particular one.

DETAILED DESCRIPTION OF VARIOUS EMBODIMENTS

Figure 1:
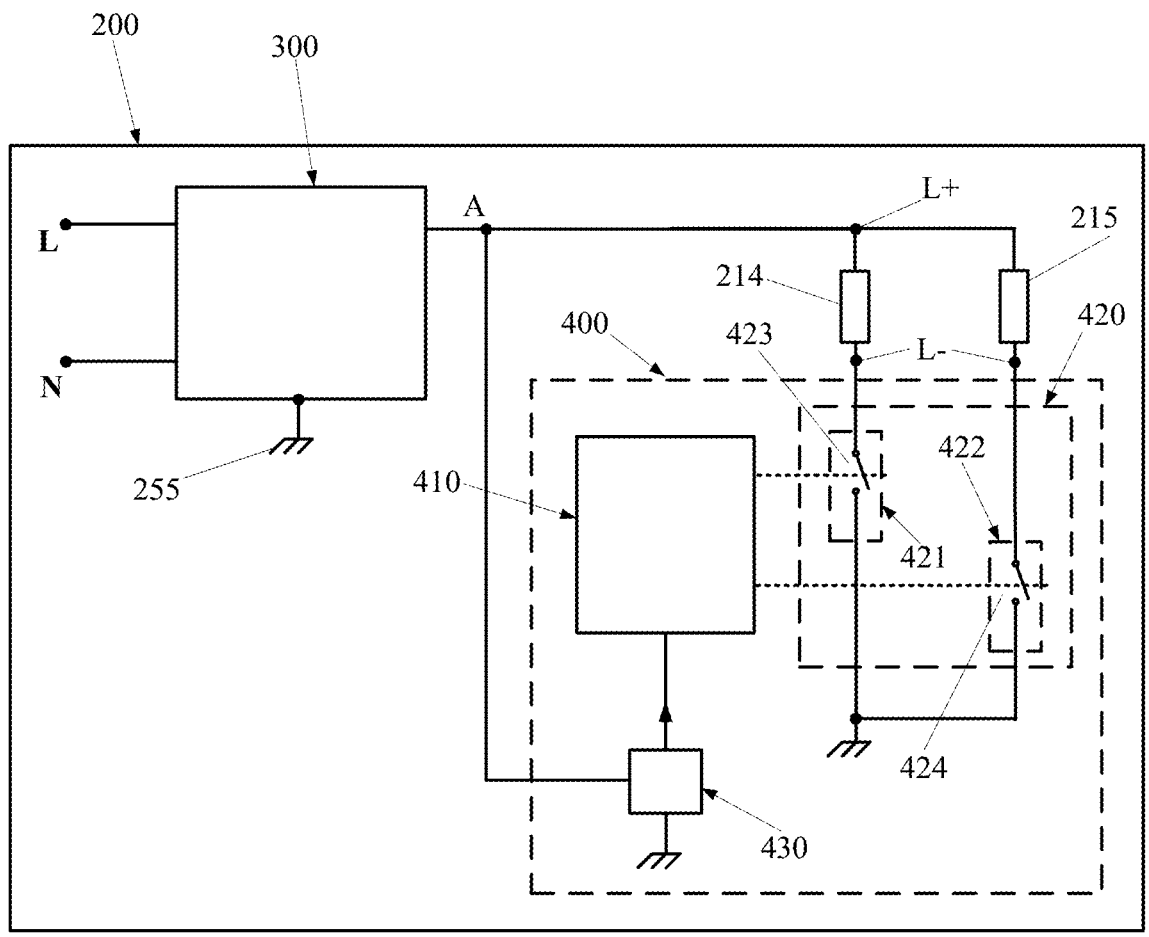
FIG. 1 is a first embodiment of an LED luminaire according to the present disclosure.

FIG. 1 is a first embodiment of an LED luminaire according to the present disclosure. In FIG. 1, the LED luminaire 200 comprises a first set of LED arrays 214 and a second set of LED arrays 215, each with a forward voltage, at least one power supply unit 300, and a phase-amplitude circuit 400. The LED luminaire 200 further comprises at least two electrical conductors "L" and "N" configured to couple to a line voltage from the AC mains to convert the line voltage into a primary direct-current (DC) voltage in the at least one power supply unit 300. Each of the first set of LED arrays 214 and the second set of LED arrays 215 comprises a positive terminal (L+) and a negative terminal (L−). The primary DC voltage, greater than the forward voltage, is configured to apply on a port A, further on the positive terminal of both the first set of LED arrays 214 and the second set of LED arrays 215 with respect to a ground reference 255. The LED luminaire 200 is used to replace a conventional luminaire with possible severe light flickering.

The phase-amplitude circuit 400 comprises a control device 410 and an LED driving circuit 420. The control device 410 is configured to produce a first set of modulating signal and a second set of modulating signal respectively at a first predetermined temporal modulation frequency and a second predetermined temporal modulation frequency. The LED driving circuit 420 comprises at least two modulation circuits 421 and 422 configured to produce a first set of driving current and a second set of driving current, in response to the first set of modulating signal and the second set of modulating signal, to respectively drive the first set of LED arrays 214 and the second set of LED arrays 215. The at least two modulation circuits 421 and 422 comprise at least two electronic switches 423 and 424 each comprising a first terminal and a second terminal. The first terminal is configured to respectively connect to the negative terminal of the first set of LED arrays and the second set of LED arrays whereas the second terminal is configured to respectively connect to the ground reference 255. Each of the first set of modulating signal and the second set of modulating signal comprises square waves comprising a series of pulses with a duty cycle of at least 40% and a predetermined period. Both the first set of driving current and the second set of driving current comprise the first set of modulating signal and the second set of modulating signal both associated with the predetermined period whereas respective light emissions from the first set of LED arrays and the second set of LED arrays in response to the first set of driving current and the second set of driving current comprise the predetermined period. When any set of LED driving current is not present, the other set of LED driving current is configured to automatically raise a duty cycle to at least 75% to avoid noticeable blinking in overall light emissions from the first set of LED arrays and the second set of LED arrays, thereby reducing perceptible flicker.

In FIG. 1, the LED driving circuit 420 comprises no filters and is deliberately to generate frequency pre-mix in the at least two modulation circuits 421 and 422. In this case, when the at least two modulation circuits 421 and 422 operate, the first set of driving current comprises not only the first predetermined temporal modulation frequency but also the second predetermined temporal modulation frequency. Similarly, the second set of driving current comprises not only the second predetermined temporal modulation frequency but also the first predetermined temporal modulation frequency due to switching interferences.

In FIG. 1, the phase-amplitude circuit 400 may further comprise a secondary power supply unit 430 configured to produce an operating voltage to enable the control device 410. The operating voltage may be high enough to cause the at least two modulation circuits 421 and 422 to nonlinearly operate, thereby creating a modulation phenomenon between the first set of modulating signal and the second set of modulating signal. A harmonic is a sinusoidal or current waveform of which its frequency is an integer multiple of the frequency at which the supply system is designed to operate (called the fundamental frequency). The distorted waveform can be decomposed to a number of fundamental frequencies and harmonic distortion harmonics derived from non-linear electronic switches.

Figure 2:
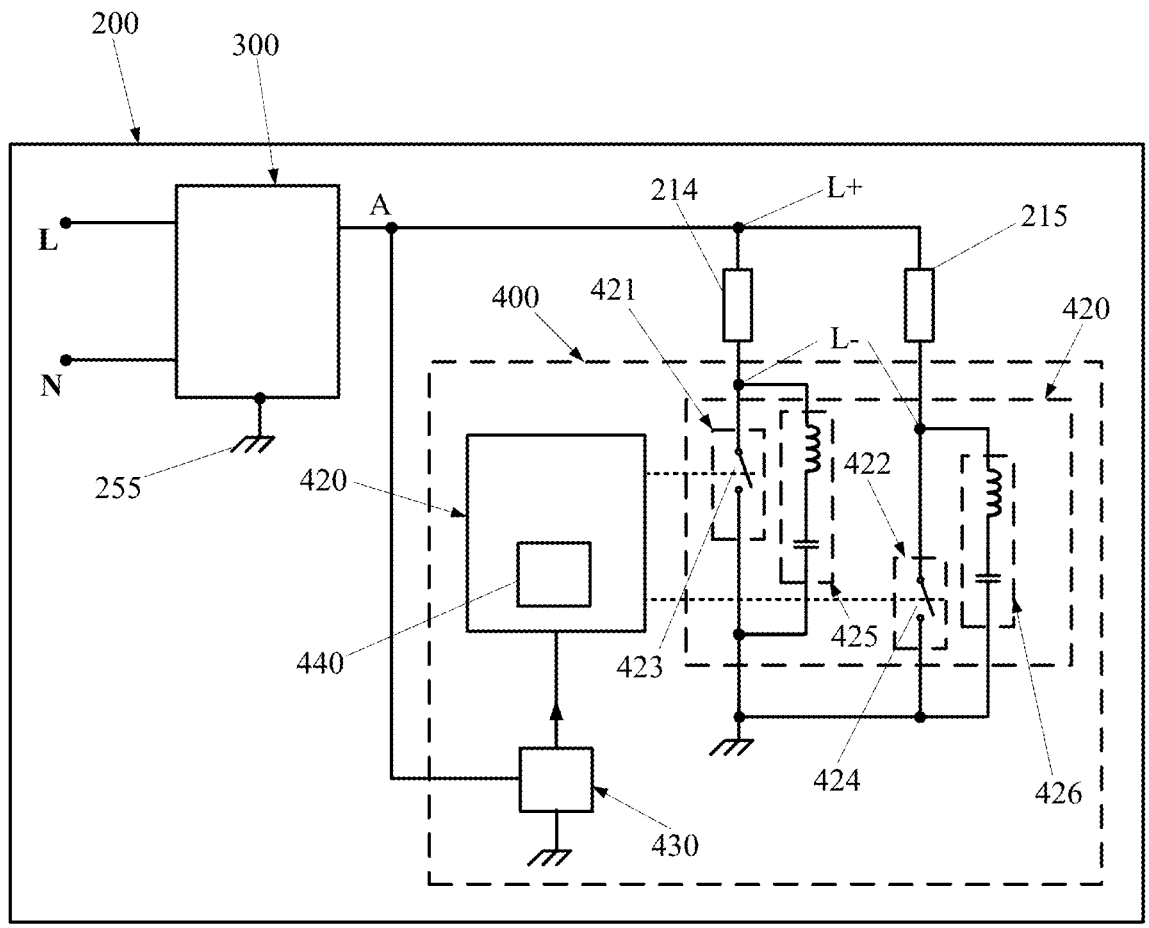
FIG. 2 is a second embodiment of an LED luminaire according to the present disclosure.

FIG. 2 is a second embodiment of an LED luminaire according to the present disclosure. In FIG. 2, the LED luminaire 200 is similar to the first embodiment as depicted in FIG. 1 except that the LED driving circuit 420 further comprises a first filter assembly 425 and a second filter assembly 426 respectively configured to suppress switching interferences induced by the at least two modulation circuits 421 and 422 and to avoid the frequency pre-mix in the first set of driving current and the second set of driving current. Moreover, the phase-amplitude circuit 400 further comprises a phase retardation circuit 440, maybe embedded in the control device 420 as a timer, configured to retard an operation of the second set of modulating signal in a predetermined phase interval, relative to the first set of modulating signal. The LED driving circuit 420 comprises at least two modulation circuits 421 and 422, as mentioned, configured to produce the first set of driving current and the second set of driving current, in response to the first set of modulating signal and the second set of modulating signal, to respectively drive the first set of LED arrays 214 and the second set of LED arrays 215. The at least two modulation circuits 421 and 422 comprise at least two electronic switches 423 and 424 configured to respond according to the first set of modulating signal and the second set of modulating signal. The at least two electronic switches 423 and 424, not necessarily BJTs as in the first embodiment, are configured to respond according to the first set of modulating signal and the second set of modulating signal. As mentioned in the first embodiment, the primary DC voltage is configured to apply on the positive terminal of both the first set of LED arrays 214 and a second set of LED arrays 215 with respect to the ground reference 255. Each of the at least two electronic switches 423 and 424 comprises the first terminal and the second terminal. The first terminal is configured to respectively connect to the negative terminal of the first set of LED arrays 214 and the second set of LED arrays 215, whereas the second terminal is configured to respectively connect to the ground reference 255. Each of the first set of modulating signal and the second set of modulating signal comprises square waves comprising a series of pulses with a duty cycle of at least 40% and a predetermined period. The two sets of driving current comprise two modulating signals both associated with the predetermined period whereas respective light emissions from the first set of LED arrays 214 and the second set of LED arrays 215 in response to the two sets of driving current comprise the predetermined period. When any set of LED driving current is not present, the other set of LED driving current is configured to automatically raise a duty cycle to at least 75% to avoid noticeable blinking in overall light emissions from the first set of LED arrays 214 and the second set of LED arrays 215, thereby reducing perceptible flicker. As mentioned, to avoid the frequency pre-mix as in the first embodiment, the LED driving circuit 420 further comprises the first filter assembly 425 and the second filter assembly 426 respectively configured to remove interference noises and unwanted frequency components.

In the second embodiment, the second predetermined temporal modulation frequency is higher than the first predetermined temporal modulation frequency. A second greatest common divisor, ranged from a nominal 4 Hz to 8 Hz, of the first predetermined temporal modulation frequency and the second predetermined temporal modulation frequency is chosen. For example, the first predetermined temporal modulation frequency may be a nominal 80 Hz, whereas the second predetermined temporal modulation frequency may be a nominal 88 Hz. The second greatest common divisor is a nominal 8 Hz. It is important to note that flickering at the nominal 4 Hz to 8 Hz, well below CFF, is significantly apparent, and choosing the second greatest common divisor of the first predetermined temporal modulation frequency and the second predetermined temporal modulation frequency ensures that a beat frequency, if occurred, will not be seen because it sometimes synchronizes with the first predetermined temporal modulation frequency and the second predetermined temporal modulation frequency, thereby imperceptible. However, the imperceptible visual stimuli still cause human brain to perceive lighting stimuli that are modulated and to demodulate thereof into a benign stimulus in the brain without an apparent flicker, thereby indirectly and endogenously entraining a gamma oscillation and drastically reducing eyestrain, visual discomfort, etc. As for phase retardation in the phase retardation circuit 440, the second set of modulating signal is configured to retard at least 200 cycles relative to the first set of modulating signal. This ensures the subject's brain can react in response to these modulated stimuli in time. The first set of modulating signal and the second set of modulating signal are modulated into electric current to drive the one or more LED arrays 214 and 215.

A resultant emission from the one or more LED arrays 214 and 215, served as two visual stimuli, is configured to stimulate visual nerves in human brain and consequently to entrain neuronal oscillations, which underlie temporal coordination of neuronal processing. Furthermore, synchronization of the neuronal oscillations enables neuronal communications across distributed brain areas to serve a variety of sensory, motor, and cognitive functions. It is well established that the neuronal oscillations at different frequencies interact with one another in a way of cross-frequency coupling (CFC). This is one of the unique features of neural oscillations in which rhythms of distinct frequencies show specific coupling properties, which potentially provides a mechanism for synchronization and interaction between local and global processes across wide cortical networks. In particular, the phase of slower oscillations modulates the power of faster oscillations, referred to as phase-amplitude coupling (PAC). In this sense, the phase-amplitude circuit 400 is used in the context. Examples are alpha (8~12 Hz) phase to gamma (>30 Hz) power coupling as observed in humans and theta (4~8 Hz) phase to gamma power coupling as observed in the rat hippocampus. Specifically, a combined light with the first predetermined temporal modulation frequency and the second predetermined temporal modulation frequency, perceived by the human brain may be a difference frequency between the first predetermined temporal modulation frequency and the second predetermined temporal modulation frequency if the difference frequency is in the alpha band or the theta band. One of advantages may include that the combined light is flicker-free if both the first predetermined temporal modulation frequency and the second predetermined temporal modulation frequency are imperceptible. In this case, any schemes using a heterochromatic flicker or invisible spectral flicker (ISF) are not necessarily needed. In operation, the one or more LED arrays 214 and 215 are alternately started to operate (i.e., retarded by several hundred cycles). The human brain may perceive that the second predetermined temporal modulation frequency is modulated relative to the first predetermined temporal modulation frequency. In that case, neuronal oscillations at frequencies in the alpha frequency band or the theta frequency band may be created in the human brain. In other words, the gamma power is phase-modulated by ongoing theta oscillations or alpha oscillations. This is a highly robust phenomenon regarded as to coordinate neuronal processing in the hippocampus system. This phenomenon has also been identified in the human medial temporal lobe and in neocortical areas from intracranial recordings. The phase of alpha oscillations has also been demonstrated to modulate gamma power in the visual system in both humans and non-human primates. The alpha-gamma coupling phenomenon has proposed to be involved in a mechanism serving to prioritize visual processing. A recent study in non-human primates demonstrated that alpha band activity reflects feedback processing whereas the gamma band activity reflects feedforward processing. Laminar V1 recordings demonstrates that alpha oscillations were generated in the superficial and deep layers and propagated toward the granular layer. Gamma oscillations, on the other hand, were generated in granular layers and propagated toward the deep and superficial layers.

Figure 3:
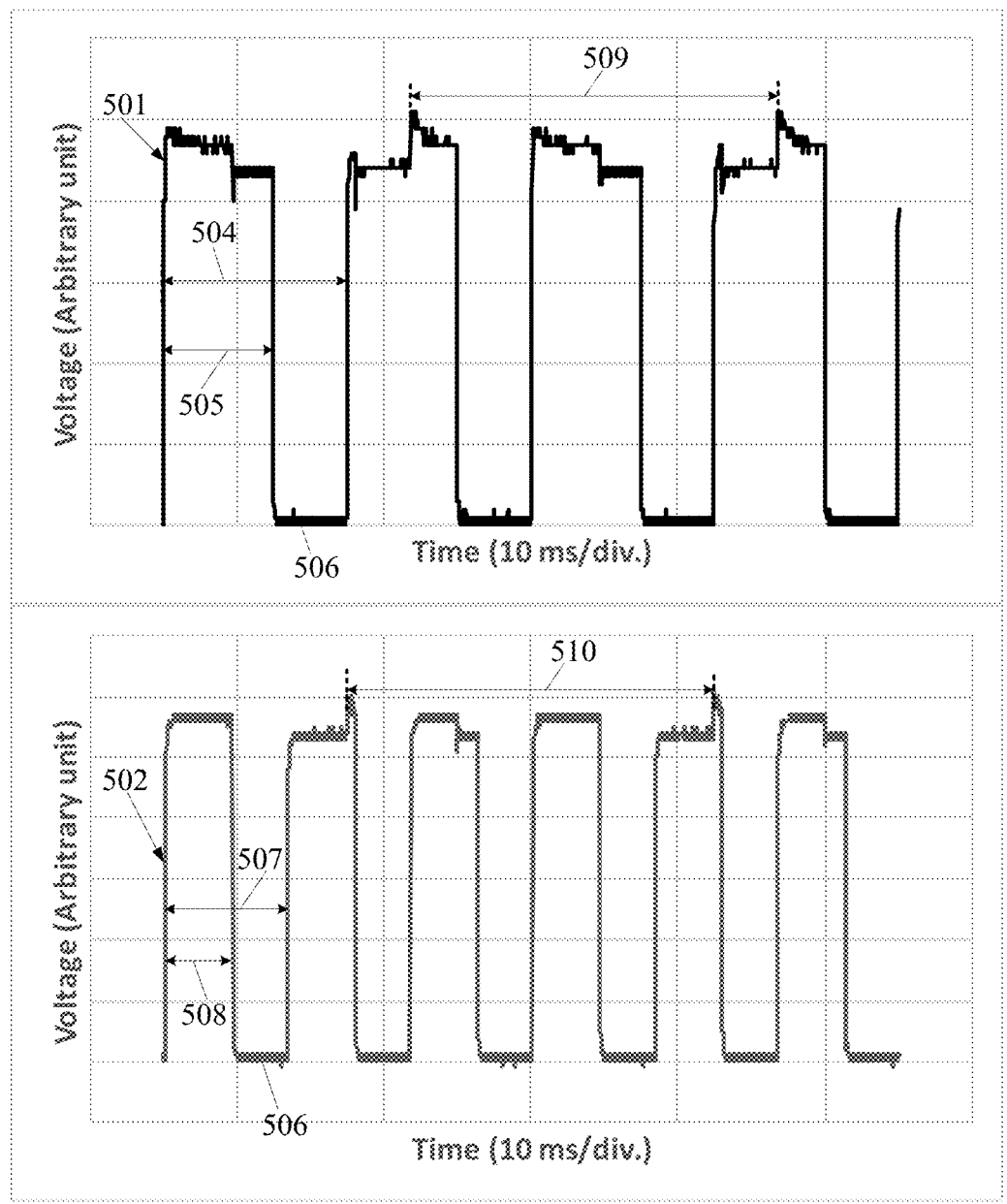
FIG. 3 is an example of modulating signals of visual stimuli according to the present disclosure.

FIG. 3 is an example of modulating signals of visual stimuli according to the present disclosure. In FIG. 3, two waveforms 501 and 502 represent two visual stimuli, respectively corresponding to the first set of driving current and the second set of driving current according to the first embodiment. In FIG. 3, the waveform 501, with a ground reference voltage 506, has a period 504, related to the first temporal modulation frequency, and a switch-on time 505, corresponding to on-time of the electronic switches controlled by the control device 410. A duty cycle in the waveform 501 can be calculated to be around 59%. Similarly, the waveform 502, with the ground reference voltage 506, has a period 507, related to the second temporal modulation frequency, and a switch-on time 508. A duty cycle in the waveform 502 can be calculated to be around 54%. Both in the waveforms 501 and 502, a pair of glitches periodically appear such as a period 509 in the waveform 501 and a period 510 in the waveform 502, corresponding to a beat frequency between the first temporal modulation frequency and the second temporal modulation frequency.

Figure 4:
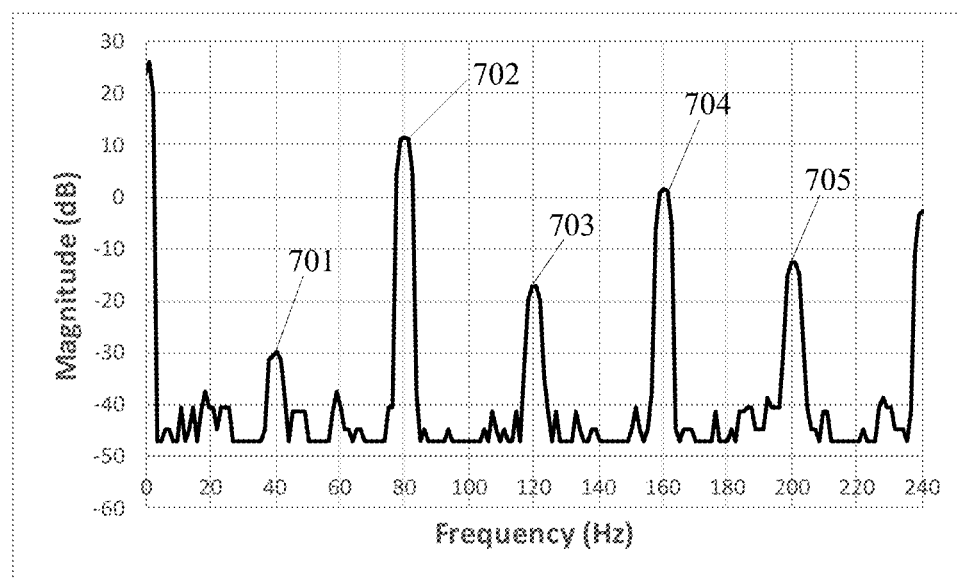
FIG. 4 is an example of a Fast Fourier Transform (FFT) of a visual stimulus according to the present disclosure.

FIG. 4 is an example of a Fast Fourier Transform (FFT) of a first visual stimulus used in the first embodiment according to the present disclosure. In FIG. 4, the horizontal axis is frequency (Hz) whereas the vertical axis is magnitude (dB). A plurality of frequency spikes are shown, namely 701, 702, 703, 704, and 705, respectively corresponding to 40 Hz, 80 Hz, 120 Hz, 160 Hz, and 200 Hz. As mentioned above, the LED driving circuit is configured to produce two sets of LED driving current in response to the two sets of modulating signals at the first temporal modulation frequency 80 Hz and the second temporal modulation frequency 120 Hz to drive the two sets of LED arrays 214 and 215. The first temporal modulation frequency 80 Hz and the second temporal modulation frequency 120 Hz are well above the critical flicker frequency (CFF) and imperceptible. Because of possible frequency pre-mix in the LED driving circuit 420, both the first set of LED driving current and the second set of LED driving current comprise the first temporal modulation frequency 80 Hz and the second temporal modulation frequency 120 Hz. Moreover, the at least two modulation circuits comprise at least two electronic switches comprising at least two bipolar junction transistors (BJTs) each configured to be biased by a signal far greater than a typical base-emitter voltages ($V_{BE}$) of 0.7 volts. Specifically, the secondary power supply unit 430 is configured to produce an operating voltage to enable the control device 410 and to operate the at least two BJTs. As mentioned above, the operating voltage is as high as 5 volts much greater than a typical base-emitter voltages $V_{BE}$ for both NPN and PNP transistors. If the at least two BJTs are made up of a silicon material, $V_{BE}$ will be 0.7 volts. The operating voltage and a signal of 5 volts applied to the at least two BJTs can cause the at least two modulation circuits 421 and 422 to nonlinearly operate, thereby creating a modulation phenomenon between the first set of modulating signal and the second set of modulating signal. A harmonic will also be generated. The distorted waveform can be decomposed to a number of fundamental frequencies and harmonic distortion harmonics derived from non-linear electronic switches. When the BJTs operate, switching at the first predetermined temporal modulation frequency and the second predetermined temporal modulation frequency cause the electrical and magnetic coupling between the first set of driving current and the second set of driving current, thereby generating a beat frequency 40 Hz at the frequency spike 701 between the first predetermined temporal modulation frequency at the frequency spike 702 and the second predetermined temporal modulation frequency at the frequency spike 703. Both the first set of LED driving current and the second set of LED driving current may further comprise a sum frequency 200 Hz at the frequency spike 705. The frequency spike 704 at 160 Hz may result from a frequency harmonic of the first temporal modulation frequency 80 Hz. The two imperceptible visual stimuli create the beat frequency 40 Hz, which directly entrains a gamma oscillation in the human brain and drastically reducing eyestrain, visual discomfort, etc.

Figure 5:
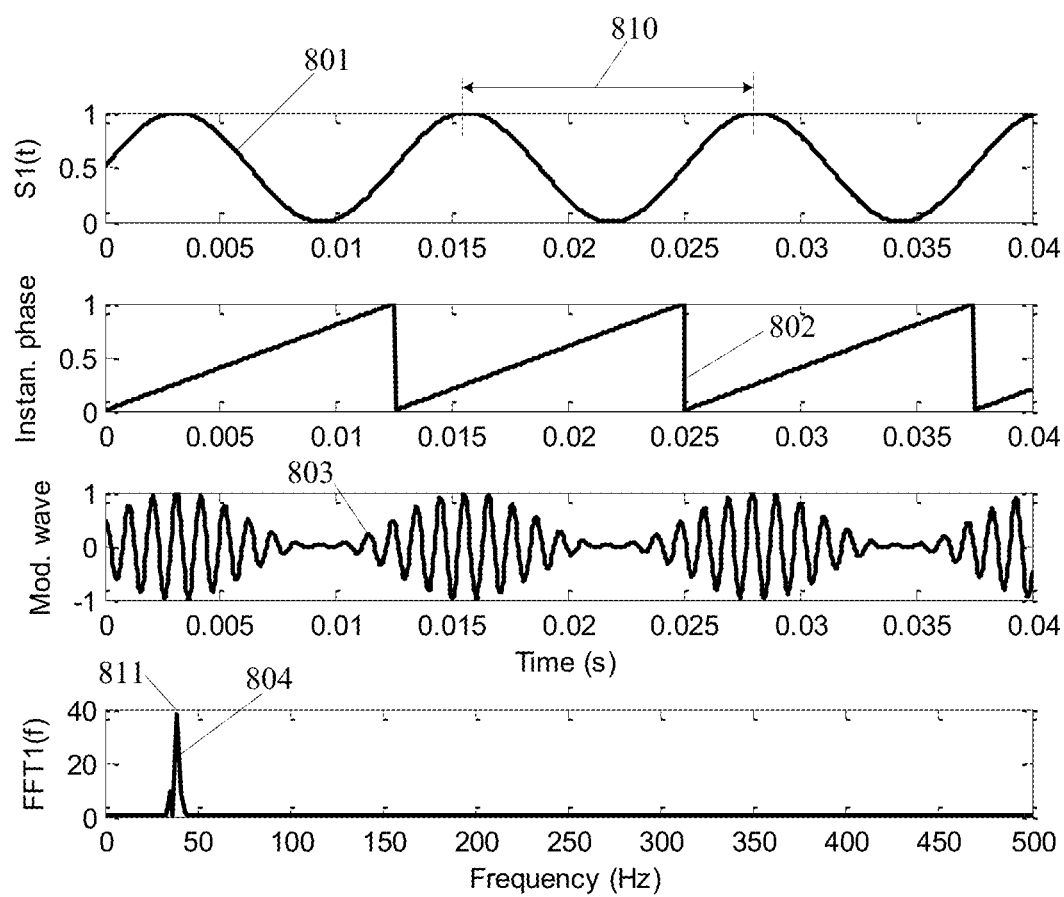
FIG. 5 is an example for various waveforms in the first embodiment according to the present disclosure.

FIG. 5 is an example for various waveforms for the first embodiment according to the present disclosure. Assuming that both the first modulating signal and the second modulating signal are sinusoidal. In FIG. 5, each of the horizontal axis for the waveform 801, the waveform 802, and the waveform 803 represents time (sec). The horizontal axis for the waveform 804 represents frequency (Hz). In the waveform 801, a modulating signal S1(t) at the first temporal modulation frequency 80 Hz is used. A period 810 represents the frequency 80 Hz. Its instantaneous phase shown in the waveform 802 is configured to modulate the second temporal modulation frequency 120 Hz, resulting in a modulated wave shown in the waveform 803. The modulated wave comprises an upper sideband and a lower sideband, respectively related to sum frequency and difference frequency between the first temporal modulation frequency 80 Hz and the second temporal modulation frequency 120 Hz. When the modulated wave is demodulated, a beat frequency between the first temporal modulation frequency 80 Hz and the second temporal modulation frequency 120 Hz appears at a frequency spike 811 denoted by 40 Hz in FFT1(f), shown in the waveform 804. This also means that the gamma oscillation in this case is exogenous, triggering directly by the 40 Hz stimulus.

Figure 6:
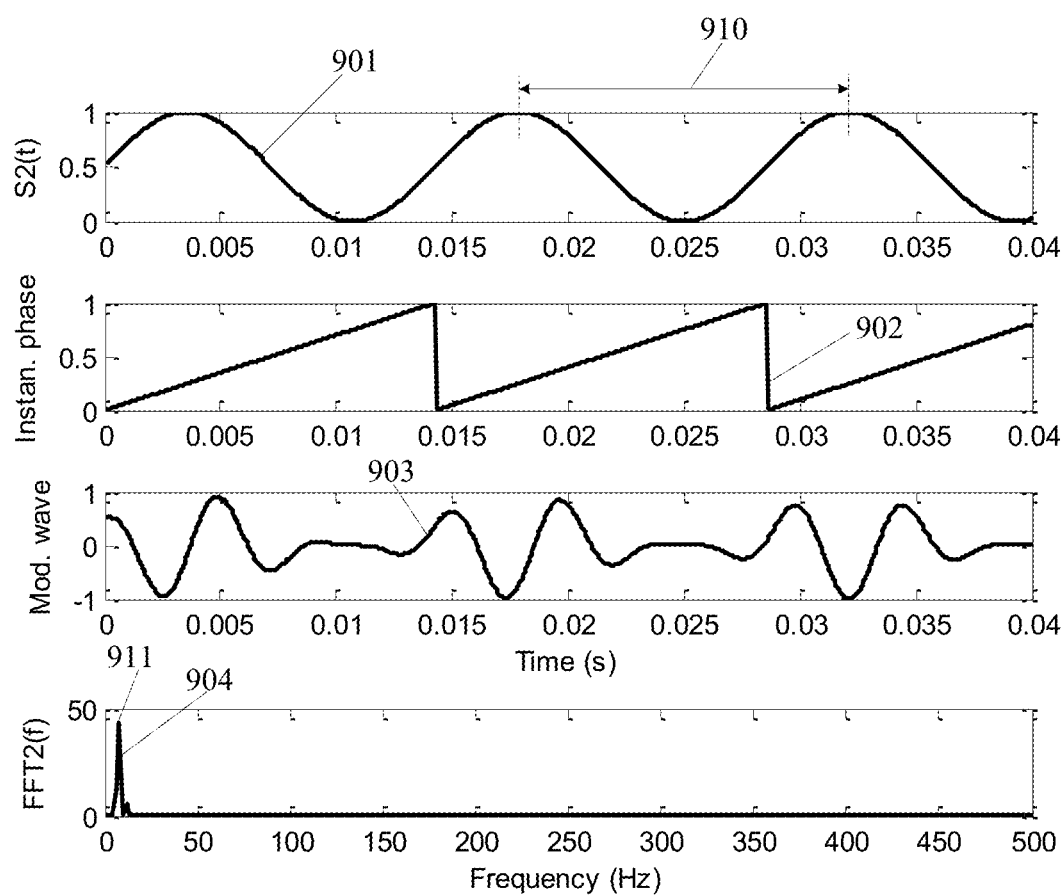
FIG. 6 is an example of phase amplitude modulated waves in the second embodiment according to the present disclosure.

FIG. 6 is an example of phase amplitude modulated waveforms in the second embodiment according to the present disclosure. Assuming that both the first modulating signal and the second modulating signal are sinusoidal. In FIG. 6, each of the horizontal axis for the waveform 901, the waveform 902, and the waveform 903 represents time (sec). The horizontal axis for the waveform 904 represents frequency (Hz). In the waveform 901, a modulating signal S2(t) at the first temporal modulation frequency 70 Hz is used. A period 910 represents the frequency 70 Hz. Its instantaneous phase shown in the waveform 902 is configured to modulate the second temporal modulation frequency 77 Hz, resulting in a phase-amplitude modulated wave shown in the waveform 903. The modulated wave comprises an upper sideband and a lower sideband, respectively related to sum frequency and difference frequency between the first temporal modulation frequency 70 Hz and the second temporal modulation frequency 77 Hz. When the phase-amplitude modulated wave is demodulated, a beat frequency between the first temporal modulation frequency 70 Hz and the second temporal modulation frequency 77 Hz appears at a frequency spike 911 denoted by 7 Hz in FFT2(f), shown in the waveform 904. In other words, the imperceptible visual stimuli in the second embodiment may cause human brain to perceive modulated lighting stimuli and to demodulate thereof into a benign theta stimulus in the brain without an apparent flicker, thereby indirectly entraining a gamma oscillation and drastically reducing eyestrain, visual discomfort, etc. This also means that the gamma oscillation is endogenous, induced by the theta rhythms.

In all, driving the first set of LED arrays at a particular temporal modulation frequency, such as 80 Hz in a gamma oscillation range 30~140 Hz, whereas operating the second set of LED arrays at another temporal modulation frequency, such as 88 Hz, creates a difference frequency of 8 Hz in the human brain. At the same time, a harmonic stimulation frequency may modulate endogenous rhythms. In other words, the endogenous rhythms can be entrained by the harmonic stimulation (i.e., 80 Hz stimulation can entrain a 40 Hz rhythm).

Whereas preferred embodiments of the present disclosure have been shown and described, it will be realized that alterations, modifications, and improvements may be made thereto without departing from the scope of the following claims. Another LED driving circuit with an output voltage and current modulated and embedded in an LED luminaire using various kinds of combinations to accomplish the same or different objectives could be easily adapted for use from the present disclosure. Accordingly, the foregoing descriptions and attached drawings are by way of example only and are not intended to be limiting.

What is claimed is:

1. A light-emitting diode (LED) luminaire, comprising:
a first set of LED arrays and a second set of LED arrays, each with a forward voltage;
at least one power supply unit configured to couple to alternate-current (AC) mains and convert a line voltage from the AC mains into a primary direct-current (DC) voltage greater than the forward voltage; and
a phase-amplitude circuit comprising a control device and an LED driving circuit, the control device configured to produce a first set of modulating signal and a second set of modulating signal respectively at a first predetermined temporal modulation frequency and a second predetermined temporal modulation frequency,
wherein:
the LED driving circuit comprises at least two modulation circuits configured to produce a first set of driving current and a second set of driving current, respectively, in response to the first set of modulating signal and the second set of modulating signal, to respectively drive the first set of LED arrays and the second set of LED arrays;
both the first predetermined temporal modulation frequency and the second predetermined temporal modulation frequency are higher than a critical flicker frequency (CFF), resulting in no perceptible flicker; and
the first predetermined temporal modulation frequency and the second predetermined temporal modulation frequency are pre-mixed in the LED driving circuit such that either the first set of driving current or the second set of driving current comprises both the first predetermined temporal modulation frequency and the second predetermined temporal modulation frequency.

2. The light-emitting diode (LED) luminaire of claim 1, wherein the at least two modulation circuits comprise at least two electronic switches comprising at least two bipolar junction transistors (BJTs) each configured to be biased by a signal far greater than a typical base-emitter voltages ($V_{BE}$) of 0.7 volts, thereby acting as a nonlinear device, and wherein, when the BJTs operate, switching at the first predetermined temporal modulation frequency and the second predetermined temporal modulation frequency cause an electrical and magnetic coupling between the first set of driving current and the second set of driving current, thereby generating a beat frequency between the first predetermined temporal modulation frequency and the second predetermined temporal modulation frequency and exogenously entraining gamma oscillations in a human brain.

3. The light-emitting diode (LED) luminaire of claim 1, wherein the primary DC voltage is configured to apply on both the first set of LED arrays and the second set of LED arrays with respect to a ground reference.

4. The light-emitting diode (LED) luminaire of claim 3, wherein each of the at least two electronic switches comprises a first terminal and a second terminal, the first terminal configured to respectively connect to a negative terminal of the first set of LED arrays and the second set of LED arrays, and the second terminal configured to respectively connect to the ground reference.

5. The light-emitting diode (LED) luminaire of claim 1, wherein each of the first set of modulating signal and the second set of modulating signal comprises square waves comprising a series of pulses with a duty cycle of at least 40% and a predetermined period, wherein the two sets of driving current comprise two modulating signals both associated with the predetermined period, and wherein respective light emissions from the first set of LED arrays and the second set of LED arrays in response to the two sets of driving current comprise the predetermined period.

6. The light-emitting diode (LED) luminaire of claim 5, wherein, when either the first set of LED driving current or the second set of LED driving current is not present, the other set of LED driving current is configured to automatically raise a duty cycle to at least 75% to avoid noticeable blinking in overall light emissions from the first set of LED arrays and the second set of LED arrays, thereby reducing perceptible flicker.

7. The light-emitting diode (LED) luminaire of claim 1, wherein a greatest common divisor of the first predetermined temporal modulation frequency and the second predetermined temporal modulation frequency is a nominal 40 Hz, thereby being embedded in the first predetermined temporal modulation frequency and the second predetermined temporal modulation frequency and no flicker perceptible.

8. The light-emitting diode (LED) luminaire of claim 1, wherein the first predetermined temporal modulation frequency is a nominal 80 Hz.

9. The light-emitting diode (LED) luminaire of claim 8, wherein the second predetermined temporal modulation frequency is a nominal 120 Hz.

10. The light-emitting diode (LED) luminaire of claim 1, wherein the control device comprises a microcontroller.

11. A light-emitting diode (LED) luminaire, comprising:
a first set of LED arrays and a second set of LED arrays, each with a forward voltage;
at least one power supply unit configured to couple to alternate-current (AC) mains and convert a line voltage from the AC mains into a primary direct-current (DC) voltage greater than the forward voltage; and
a phase-amplitude circuit comprising a control device, a phase retardation circuit, and an LED driving circuit, the control device configured to produce a first set of modulating signal and a second set of modulating signal respectively at a first predetermined temporal modulation frequency and a second predetermined temporal modulation frequency,
wherein:
the LED driving circuit comprises at least two modulation circuits configured to produce a first set of driving current and a second set of driving current, respectively, in response to the first set of modulating signal and the second set of modulating signal, to respectively drive the first set of LED arrays and the second set of LED arrays;

the at least two modulation circuits comprise at least two electronic switches and at least two filter assemblies respectively configured to respond according to the first set of modulating signal and the second set of modulating signal and to suppress interference noises induced by switching the at least two electronic switches, thereby rejecting a frequency premix; and the phase retardation circuit is configured to retard an operation of the second set of modulating signal in a predetermined phase interval, relative to the first set of modulating signal.

12. The light-emitting diode (LED) luminaire of claim 11, wherein the primary DC voltage is configured to apply on both the first set of LED arrays and the second set of LED arrays with respect to a ground reference.

13. The light-emitting diode (LED) luminaire of claim 12, wherein each of the at least two electronic switches comprises a first terminal and a second terminal, the first terminal configured to respectively connect to a negative terminal of the first set of LED arrays and the second set of LED arrays, and the second terminal configured to respectively connect to the ground reference.

14. The light-emitting diode (LED) luminaire of claim 11, wherein each of the first set of modulating signal and the second set of modulating signal comprises square waves comprising a series of pulses with a duty cycle of at least 40% and a predetermined period, wherein both the first set of driving current and the second set of driving current comprise the first set of modulating signal and the second set of modulating signal both associated with the predetermined period, and wherein respective light emissions from the first set of LED arrays and the second set of LED arrays in response to the first set of driving current and the second set of driving current comprise the predetermined period.

15. The light-emitting diode (LED) luminaire of claim 14, wherein, when either of the first set of LED driving current or the second set of driving current is not present, the other set of LED driving current is configured to automatically raise a duty cycle to at least 75% to avoid noticeable blinking in overall light emissions from the first set of LED arrays and the second set of LED arrays, thereby reducing a perceptible flicker.

16. The light-emitting diode (LED) luminaire of claim 11, wherein the second predetermined temporal modulation frequency is a nominal 4 Hz to 12 Hz higher than the first predetermined temporal modulation frequency, thereby generating theta or alpha rhythms and endogenously entraining gamma oscillations in a human brain.

17. The light-emitting diode (LED) luminaire of claim 11, wherein the second predetermined temporal modulation frequency is higher than the first predetermined temporal modulation frequency, and wherein a greatest common divisor of the first predetermined temporal modulation frequency and the second predetermined temporal modulation frequency is ranged from a nominal 4 Hz to 12 Hz, thereby generating theta or alpha rhythms and endogenously entraining gamma oscillations in a human brain.

18. The light-emitting diode (LED) luminaire of claim 11, wherein the first predetermined temporal modulation frequency is a nominal 80 Hz.

19. The light-emitting diode (LED) luminaire of claim 11, wherein the control device comprises a microcontroller.

\* \* \* \* \*